R. H. RICE.
SHAFT BEARING.
APPLICATION FILED AUG. 6, 1919.

1,413,425.

Patented Apr. 18, 1922.

Inventor,
Richard H. Rice,
by Albert G. Davis
His Attorney.

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

SHAFT BEARING.

1,413,425.　　　　Specification of Letters Patent.　　Patented Apr. 18, 1922.

Application filed August 6, 1919. Serial No. 315,748.

*To all whom it may concern:*

Be it known that I, RICHARD H. RICE, a citizen of the United States, residing at Lynn, county of Essex, State of Massachusetts, have invented certain new and useful Improvements in Shaft Bearings, of which the following is a specification.

The present invention relates to shaft bearings, particularly to the lubrication thereof, and has for its object to provide an improved structure and arrangement in an apparatus of this character.

In connection with certain apparatus it is important that no lubricant shall leak from the bearing into the apparatus casing and more particularly, the object of my invention is to provide an improved structure and arrangement which will effectually prevent such leakage.

One application to which my invention is well adapted is in connection with centrifugal compressors which are mounted on aeroplanes for supplying compressed air to the engines, and the invention is specifically illustrated and described in such connection. It will be understood, however, that the invention is not necessarily limited thereto.

For a consideration of what I believe to be novel and my invention, attention is directed to the accompanying specification and the claims appended thereto.

Figure 1:
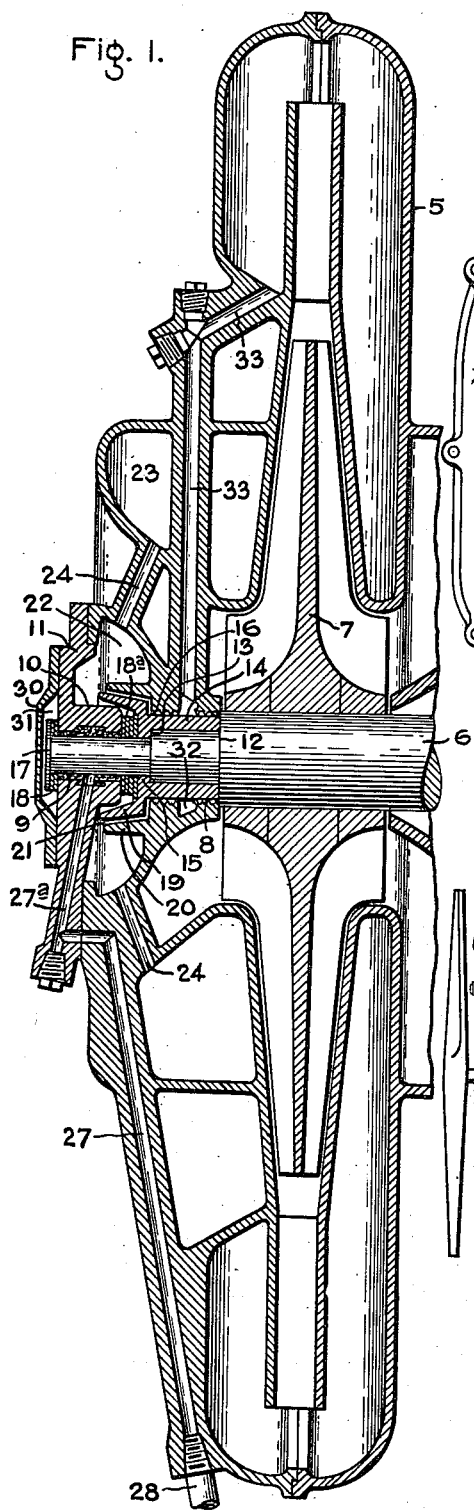
Figure 2:
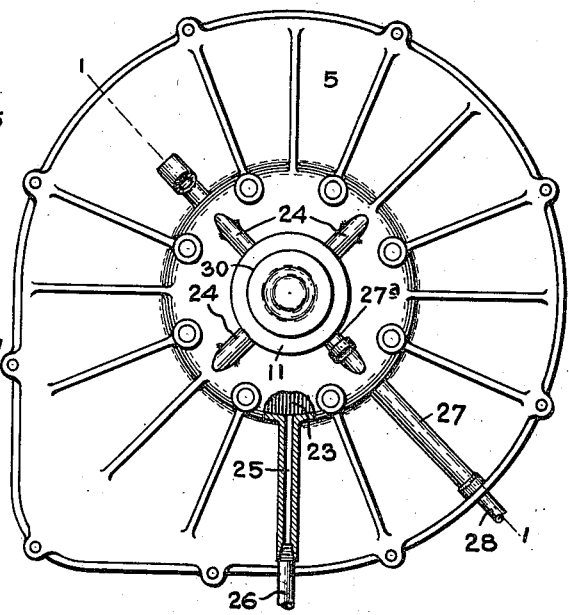
Figure 3:
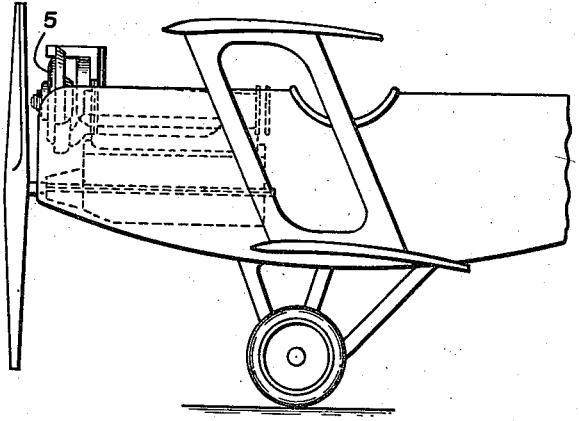

In the drawing, Fig. 1 is a diametrical section taken on line 1—1, Fig. 2, of a centrifugal compressor provided with a bearing embodying my invention; Fig. 2 is a face view thereof partly in section, and Fig. 3 shows the compressor mounted on an aeroplane.

Referring to the drawing, 5 indicates the casing of a centrifugal compressor and 6 its shaft upon which is mounted the impeller 7. In the present instance the compressor is shown in Fig. 3 as being mounted on an aeroplane and it may be driven in any suitable manner such as by a small turbine wheel operated by exhaust gases from the aeroplane engine. The air from the compressor may be supplied to the carburetor of the engine. The end of shaft 6 passes through an opening 8 in the front wall of casing 5 and is carried in a bearing 9 which is located in a hub 10 on a cover plate 11 suitably fastened to casing 5. The end of shaft 6 is reduced in diameter where it passes through casing 5 and it is further reduced in diameter before it enters bearing 9 thus forming two shoulders 12 and 13. Surrounding the reduced portion of shaft 6 where it passes through casing 5 is a sleeve 14, the inner end of which engages shoulder 12 and the outer end of which is provided with a flange 15 which engages shoulder 13. Sleeve 14 turns with the shaft and between it and the wall of opening 8 is a packing means to minimize leakage. In the present instance this packing means is shown in the form of a series of spaced annular teeth 16 carried by casing 5 and having a close clearance with the shaft. On the outer end of shaft 6 is a head 17 and between head 17 and the one end of hub 10, and between the end of sleeve 14 and the other end of hub 10 are washers 18 and 18ᵃ which serve to position shaft 6 axially and take the axial thrust of the shaft. Carried by shaft 6 is an outwardly flared annular deflector ring 19 which surrounds the inner end of hub 10. Deflector ring 19 is formed integral with sleeve 14 and surrounding it is a second annular ring 20 which projects from the wall of casing 5. Between rings 19 and 20 is an annular clearance space 21. Surrounding bearing hub 10 is an annular chamber 22 and surrounding chamber 22 is a second annular chamber 23. Chambers 22 and 23 are connected by a suitable number of passages 24, four such passages, spaced 90° apart being shown in the present instance. Leading from chambers 23 is a drain passage 25 to which is connected a drain pipe 26 which may lead to any suitable place. Lubricant under pressure is supplied to the bearing through passages 27, 27ᵃ formed as integral parts of casing 5 and cover plates 11. Passages 24, 25, 27 and 27ᵃ are formed directly in the casing parts so as to avoid the use of pipes which are always likely to become loosened by vibration and develop leaks. 28 indicates a supply pipe connected to passage 27. Supply pipe 28 may lead from any suitable source of lubricant supply. Fastened over the outer end of shaft 6, is a cap 30, which provides a lubricant chamber 31.

In operation, lubricant is supplied through passages 27 and 27ᵃ, to the bearing to lubricate it, the lubricant spreading over the bearing surfaces, in the usual manner. Lubricant that passes through the bearing inwardly past washers 18ᵃ is caught by deflector ring 19 and thrown outward by centrifugal force into annular chamber 22. From chamber 22 the lubricant flows through passages 24 to annular drain chamber 23 from whence it is drained away through passage 25 and drain pipe 26. It will be noted that deflector ring 19 prevents the leakage of lubricant from the bearing directly into the compressor casing and that for any lubricant to reach the compressor casing it must pass through the clearance 21 between deflector ring 19 and surrounding stationary ring 20. However, passage of lubricant through clearance space 21 will be prevented due to centrifugal action of deflector ring 19. I provide also additional means for preventing such leakage in that I connect clearance space 21 and the packing between shaft 6 and casing 5 with the discharge side of the compressor so compressed air is supplied thereto. To this end at the central portion of the packing is an annular chamber 32 connected to the discharge side of the compressor by a passage 33. Air thus supplied to chamber 32 flows in each direction along sleeve 14, that flowing outwardly passing through clearance 21 to prevent the entrance of lubricant to such clearance.

Lubricant thrown outward by deflector ring 19 into chamber 22 will be quickly drained off into drain chamber 23 so there will be no accumulation of lubricant in chamber 22. An aeroplane in flight may assume various angles and for this reason when my bearing arrangement is used in connection with a compressor mounted on an aeroplane I provide passages 24 disposed entirely around the bearing so no matter what position the bearing may be in lubricant can drain from chamber 22 to chamber 23.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination, a wall having an opening, a shaft passing through said opening, a bearing for the shaft carried by the wall, said bearing being spaced from the wall, means for supplying lubricant to the bearing, and means for preventing lubricant from leaking along said shaft through the wall opening, said means comprising a chamber surrounding the bearing, a deflector ring carried by the shaft between the wall and bearing and projecting toward the bearing, said deflector ring serving to direct lubricant from the bearing to said chamber, and means for preventing leakage along the outer surface of the deflector toward the wall opening.

2. In combination, a wall having an opening, a shaft passing through said opening, a bearing for the shaft carried by the wall, said bearing being spaced from the wall, means for supplying lubricant to the bearing, a chamber surrounding the bearing, a deflector ring carried by the shaft between the wall and bearing which serves to direct lubricant from the bearing to said chamber, and a ring carried by the wall which surrounds said deflector ring and has a close clearance therewith.

3. In combination, a wall having an opening, a shaft passing through said opening, a bearing for the shaft carried by the wall, said bearing being spaced from the wall, means for supplying lubricant to the bearing, a chamber surrounding the bearing, a deflector ring carried by the shaft between the wall and bearing which serves to direct lubricant from the bearing to said chamber, means forming a second chamber surrounding said first named chamber, and means forming a passage which connects said chambers so lubricant may flow from one to the other.

4. In combination, a wall having an opening, a shaft passing through said opening, a bearing for the shaft carried by the wall, said bearing being spaced from the wall, means for supplying lubricant to the bearing a chamber surrounding the bearing, a deflector ring carried by the shaft between the wall and bearing which serves to direct lubricant from the bearing to said chamber, a ring carried by the wall which surrounds said deflector ring and has a close clearance therewith, and means for supplying fluid under pressure to the clearance space between said rings.

5. The combination with a compressor having a casing and a shaft which projects through it, of a bearing for the shaft, means forming a chamber surrounding said bearing, a deflector ring carried by the shaft, a second ring carried by the casing and having a close clearance with the first ring, and means for supplying fluid from the delivery side of said compressor to the clearance space between said rings.

6. In combination, a wall having an opening, a shaft passing through said opening, a bearing for the shaft carried by the wall, said bearing being spaced from the wall, means for supplying lubricant to the bearing, a chamber surrounding the bearing, a deflector ring carried by the shaft between the wall and bearing which serves to direct lubricant from the bearing to said chamber, means forming a second chamber surrounding said first named chamber, and means forming passages spaced around the shaft for connecting said chambers.

7. The combination with an aeroplane and a machine thereon having a casing and a shaft projecting through the casing, of a bearing for the shaft, means for supplying lubricant to the bearing, and means for preventing lubricant from leaking from the bearing into said casing irrespective of the position of the aeroplane, said last named means comprising a deflector ring, a chamber surrounding the bearing, and passages spaced around the bearing and leading from said chamber.

8. The combination with an aeroplane and a machine thereon having a casing and a shaft projecting through the casing, of a bearing for the shaft, means for supplying lubricant to the bearing, and means for preventing lubricant from leaking from the bearing into said casing irrespective of the position of the aeroplane, said last named means comprising a deflector ring, a chamber surrounding the bearing, a second chamber surrounding the first named chamber, passages spaced around the bearing and connecting said chambers, and a drain leading from the second named chamber.

In witness whereof, I have hereunto set my hand this 4th day of August, 1919.

RICHARD H. RICE.